Dec. 22, 1925.  1,567,014
H. P. TAYLOR
APPARATUS FOR REDUCING THE OFFAL IN SLAUGHTERHOUSES TO GREASE AND TANKAGE
Filed August 5, 1922
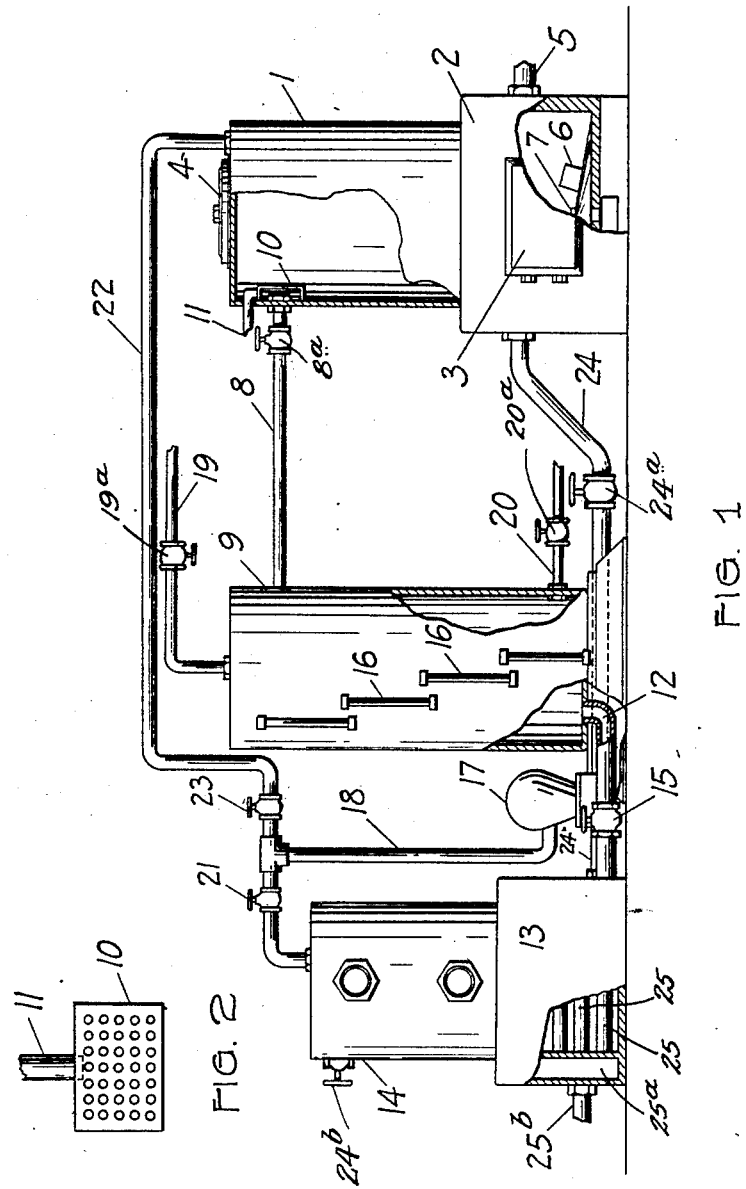
INVENTOR.
Hugh P. Taylor,
BY Howard S. Smith,
ATTORNEY.

Patented Dec. 22, 1925.

1,567,014

UNITED STATES PATENT OFFICE.

HUGH P. TAYLOR, OF DAYTON, OHIO, ASSIGNOR TO PEARL B. BROKAMP, OF DAYTON, OHIO.

APPARATUS FOR REDUCING THE OFFAL IN SLAUGHTERHOUSES TO GREASE AND TANKAGE.

Application filed August 5, 1922. Serial No. 579,942.

*To all whom it may concern:*

Be it known that I, HUGH P. TAYLOR, a citizen of the United States, residing at Dayton, in the county of Montgomery and State of Ohio, have invented certain new and useful Improvements in Apparatus for Reducing the Offal in Slaughterhouses to Grease and Tankage, of which the following is a specification.

The principal object of my invention is to provide a simple and efficient means for reducing the offal in slaughter houses to merchantable grease and tankage.

It is another object of my invention to boil the protein and grease out of the stock in one vessel, over into another vessel absolutely without contact with the atmosphere. My process is a continuous operation from the time it is started until it is finished, as contrasted with the process of cooking the tankage one day and waiting until another day to draw off the grease.

It is another object of my invention to provide screening means into which steam is injected to prevent floaters from entering the conduit which conducts the protein and grease from the cooking tank to the receiving tank.

In the accompanying drawings, Figure 1 is a side elevational view, partly broken away and in section, of my offal reducing unit. And Figure 2 is a front view of the screening device for preventing floaters from entering the protein and grease conducting conduit which leads from the offal tank to the receiving tank.

Throughout the specification and drawings, similar reference characters denote corresponding parts.

Referring to the accompanying drawings illustrating one form of embodiment of my invention, the numeral 1 designates a tank mounted on a hollow base 2 provided with a hinged door 3 which closes an opening from which condensed protein may be withdrawn. Offal is introduced into the tank 1 through a hole in its top portion that is closed by a cover plate 4. The latter is adapted to tightly seal the tank after the stock has been admitted to prevent contact of the same with the outside atmosphere.

My improved method of reducing the offal in the tank 1 consists first in introducing steam to the latter through a tube 5 for the purpose of cooking the stock. As a result of this cooking of the offal, protein and grease will pass from the top of the tank 1 through a conduit 8 into a receiving tank 9 a valve 8ª being provided in the conduit 8 to prevent grease being forced back in the tank 1 during its removal from the tank 9.

An agitator 6 is mounted upon and rotated by a shaft 7 within the tank 1 to agitate the stock during the cooking operation.

To prevent floaters such as the lungs of carcasses from entering the conduit 8, the following means are provided. Suitably secured to the inner wall of the tank 1 over the end of the conduit 8 which communicates with the tank, is a hollow box-like member 10 open at its end nearest the conduit and having its other end apertured as shown in Figure 2. Communicating with this member 10 is a steam tube 11. When floaters arise to the top of the liquid in the tank 1, they are prevented from entering the conduit 8, with the protein and grease, by the apertured member 10 into which steam is introduced through the tube 11 to blow these floaters away from the hollow member and thereby prevent the openings in the latter from becoming clogged. (See Figures 1 and 2.)

Communicating with the bottom of the receiving tank 9 is a conduit 12 which leads to the base portion 13 of an evaporating tank 14. The conduit 12 has a valve 15 to shut off the flow of liquid from the receiving tank 9 to the evaporating tank 14. From the tank 9 the finely divided solid protein suspended in water, which is below the grease therein, will be drawn through the conduit 12 into the evaporating tank 14 by the suction means hereinafter to be described when the valve 15 is opened. Sight tubes 16 are secured to the outside of the receiving tank 9 to indicate when it is the proper time to close the valve 15 to prevent the flow of grease also to the evaporating tank 14.

The finely divided solid protein suspended in water is drawn into the evaporating tank 14 by the vacuum created in the latter assisted by the steam pressure behind the protein in the tank 1. This vacuum is created by a suction pump 17 from which a suction tube 18 leads to the top of the evaporating tank 14.

When the protein has passed from the receiving tank 9 into the evaporating tank 14, the grease which remains in the receiving tank 9 is forced by water into an outlet tube 19 provided with a valve 19$^a$. This tube 19 leads from the top of the receiving tank to a receptacle not shown. My apparatus makes it unnecessary to dip or drain off the grease, for it may be forced to any part of a building by the water which is introduced into the tank 9 through a line 20 provided with a valve 20$^a$. The labor of removing of the grease by dipping or other manual methods is thereby eliminated.

Provided in the suction line 18 is a valve 21 by means of which, after the protein has passed from the tank 9 into the tank 14, no more air may be withdrawn from the top of the latter tank by the pump. Leading from the suction line 18 to the top of the offal tank 1 is an air-exhausting conduit 22 provided with a valve 23 which, when it is opened and the valve 21 is closed, will permit the pump 17 to withdraw sufficient air from the tank 1 to cause the protein which has been concentrated in the evaporating tank 14 to be drawn into the tank 1 through a return conduit 24. Provided in this conduit 24 is a valve 24$^a$, so that during the cooling operation no material can pass from the tank 1 to the tank 14. A valve 24$^b$ is placed in the tank 14 near the top thereof to permit, when opened, air to enter the tank and prevent the formation of a vacuum therein during the removal of protein from the tank 14 to the tank 1. Within the base portion 13 of the evaporating tank 14 are horizontal steam tubes 25 and a communicating vertical steam passage 25$^a$ to which steam is admitted through a tube 25$^b$. This protein which has been concentrated by the process of evaporation in the tank 14, which is heated by steam introduced in the steam jacket in its base portion 13 through a tube 25, has high commercial value as stock food, fertilizer and the like, and may be readily withdrawn for that purpose through the opening in the base portion of the tank 1 after the door 3 closing that opening, is swung back. On the other hand, this concentrated protein after it is drawn back into the tank 1, may be left there to combine with the original stock for the purpose of increasing its strength.

Having described my invention, I claim:

In an apparatus of the type described, an offal tank for cooking a quantity of offal and having an opening in its side, near its top, covered by a screen, means for injecting steam behind said screen to keep it clear of obstacles, a receiving tank, a conduit connecting the receiving tank with that portion of the offal tank located behind said screened opening to float melted grease and portions of finely divided protein from the offal tank to the receiving tank, a grease outlet conduit at the top of the receiving tank, means for introducing water into the bottom of the receiving tank to force the grease into said grease outlet, an evaporating tank, a steam jacket in the bottom of the latter, means for introducing steam to said jacket, means for drawing protein from the bottom of the receiving tank into the evaporating tank, and means for conducting the concentrated protein from said evaporating tank to the first tank for removal.

In testimony whereof I have hereunto set my hand this 4th day of August, 1922.

HUGH P. TAYLOR.